United States Patent [19]

Parsi

[11] Patent Number: 4,871,431
[45] Date of Patent: Oct. 3, 1989

[54] APPARATUS FOR THE REMOVAL OF DISSOLVED SOLIDS FROM LIQUIDS USING BIPOLAR MEMBRANES

[75] Inventor: Edgardo J. Parsi, Lexington, Mass.
[73] Assignee: Ionics, Incorporated, Watertown, Mass.
[21] Appl. No.: 217,905
[22] Filed: Jul. 11, 1988
[51] Int. Cl.[4] ............................................. B01D 13/02
[52] U.S. Cl. .................................. 204/182.4; 204/301
[58] Field of Search ................. 204/301, 182.4, 182.5, 204/182.6, 151

[56] References Cited

U.S. PATENT DOCUMENTS

| | | | |
|---|---|---|---|
| 2,815,320 | 12/1957 | Kollsman | 204/301 X |
| 2,854,394 | 9/1958 | Kollsman | 204/301 X |
| 3,145,061 | 9/1964 | Parsi | 204/301 X |
| 4,615,780 | 10/1986 | Walker | 204/301 X |

Primary Examiner—John F. Niebling
Assistant Examiner—John S. Starsiak, Jr.
Attorney, Agent, or Firm—Norman E. Saliba

[57] ABSTRACT

An apparatus containing a multiplicity of two or three chamber units comprising a combination of ion exchange membranes and bipolar membranes with certain of said chambers containing a filler of ion-exchange material. The apparatus can be used to remove weakly ionized substances such as silica from water. The three chamber unit can be further used to pretreat (acidify) water prior to treatment of the water in an electrodialysis or electrodeionization stack.

17 Claims, 2 Drawing Sheets

APPARATUS FOR THE REMOVAL OF DISSOLVED SOLIDS FROM LIQUIDS USING BIPOLAR MEMBRANES

OBJECT OF THE INVENTION

This invention relates to a process and apparatus to substantially remove dissolved solids from liquids under the influence of an electric current. It also relates to the removal of weakly ionized acidic substances from liquids, in particular but not limited to silica and carbon dioxide from water. A need for deionized and desilicized water exists in feed water for high pressure boilers, ultrapure water for manufacture of semiconductors and other electronic components, for laboratories, and in the manufacture of certain chemicals.

It is the object of this invention to provide a process and apparatus for water treatment by novel combinations of bipolar membranes, ion exchange membranes and electrically regenerated ion exchange resin. More specifically it relates to two-bed ion exchange deionization of water, electrically regenerated removal of silica, carbon dioxide, or other weakly ionized acidic substances from water, and synergistic combinations of the above employing electrodeionization (EDI), electrodialysis with current reversal (EDR) and electrodialysis (ED). In the latter embodiments the object of the invention is to pretreat the feed water to the EDI, EDR or ED process by electrical conversion of a fraction of the ionic total dissolved solids (TDS) into acid in one compartment of the bipolar membrane apparatus, while simultaneously removing silica from the deionized product in another compartment of the same apparatus. In each of the embodiments of this invention the acid and the base required for the electrical regeneration are produced electrically "in situ" by dissociation of water molecules at the bipolar membranes. The novel multi-membrane electrodialysis apparatus encompasses combinations and operation of cell configurations containing bipolar membranes, ion-exchange resin filled compartments and ion exchange membranes. These configurations and the methods of the invention will be described in more detail in the material that follows so that it may be clearly understood by a person versed in the art.

According to the present invention, the hydroxide and acid required are generated by a bipolar membrane strategically located in a multi-membrane stack. Bipolar membranes are composite laminates consisting of cation exchange resin on one side and anion exchange resin on the opposite side. When a DC voltage is applied perpendicular to the plane of the bipolar membrane, with the anion membrane side oriented toward the anode, acid and base are generated by dissociation of water molecules into hydrogen cations and hydroxide anions.

DESCRIPTION OF THE PRIOR ART

Bipolar membranes were originally discussed by V. J. Frilette, Preparation and Characterization of Bipolar Membranes, J. Phys. Chem., 60 (1956) 435. Since then there have been a number of patents issued in the U.S. on bipolar membranes and their applications. Some types of bipolar membranes are commercially available from Allied Corporation and others.

The regeneration of ion-exchange resins used for water deionization and for removal of silica from water requires the handling of hazardous acid and base. Silica removal is most commonly done by employing an anion exchange resin in the hydroxide form. When exhausted, the resin is regenerated with strong aqueous sodium hydroxide. This practice requires the purchase and handling of hazardous sodium hydroxide. A key advantage of the present invention is that no dangerous chemicals need to be handled to regenerate the resin in the silica removal cells, because the acid and the hydroxide necessary to maintain the ion exchange resin in a regenerated mode is produced in situ by bipolar membranes.

Neither ED nor EDI alone are effective in removing silica from water. A. J. Giuffrida in U.S. Pat. No. 4,298,442 teaches the addition of sodium hydroxide, potassium hydroxide, or ammonium hydroxide to the water to be treated to enable removal of silica from the water by ED. This method suffers from the disadvantage of having to handle the chemicals to be added and is not too efficient in that the hydroxide added to the water is removed very effectively by the ED process.

G. C. Ganzi, et. al. in "Ultrapure Water" April 1987, p. 50, states that "It should be noted that nonionic species are not removed by electrodeionization. Dissolved carbon dioxide will be removed to the extent that it is converted to bicarbonate salts. If the feedwater is too acidic, base addition to an approximately neutral pH may be required to achieve carbon dioxide removal. Silica is weakly ionized and is removed only partially by the Ionpure TM process" (Millipore Corporation's U.S. Pat. No. 4,632,745). Furthermore, to avoid deposition of scaling compounds within the EDI membrane stack, a softener is incorporated ahead of the EDI membrane stack to remove hardness from the feed water. As stated in the previous paragraph, one of the objects of the present invention is to allow removal of silica from the water product of EDI, while also acidifying the feed water to the EDI stack sufficiently so that it is not necessary to soften the feed water.

The applicant, in an alternative approach, (U.S. Pat. No. 3,149,061 which is expressly incorporated herein by reference) disclosed a method in which ion exchange resin is disposed between anion and cation membranes in an electrodeionization apparatus of the multi-membrane type in which the resin particles are regenerated by polarization occurring at the liquid interface of the membranes or resin particles.

The invention itself may be more fully understood from the following description when read in conjunction with the accompanying drawings.

DESCRIPTION OF THE PROCESS AND APPARATUS OF THE INVENTION

Figure 1:
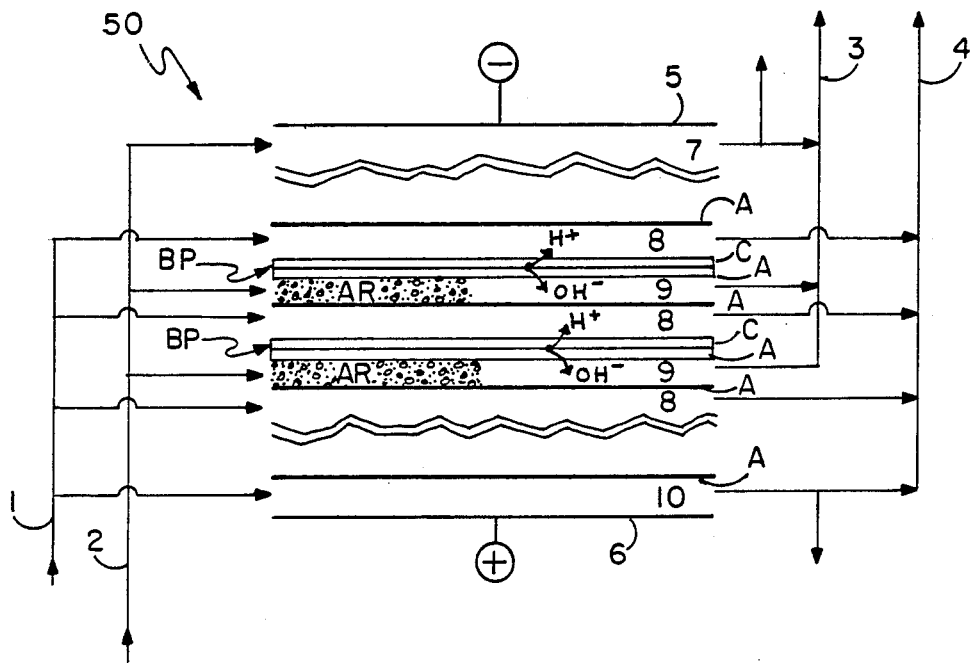
FIG. 1 is a schematic of one embodiment of the invention using a single-bed exchange apparatus for containing bipolar and anion membranes.

FIG. 1 is a schematic of one embodiment of this invention especially for the removal of silica showing only two repeating sections or units of a multiple section stack or cell 50. The base producing compartments or chambers 9 may be filled with anion exchange resin AR, preferably a base resistant resin such as Rohm & Haas IRA458, to increase the electrical conductance of the compartments and to extend the anion resin surface available for mass transfer in order to increase the efficacy of silica removal. However, it is not intended that the apparatus be limited to resin filled compartments. The resin may be in the form of beads, fibers, porous solids, or extensions of the anion membrane such as that created by embossing. Ion-exchange beads are commercially available from several manufacturers, including Rohm & Haas, Dow and others.

Ion exchange membranes are commercially available from Ionics, Incorporated, Ionac, and others in the U.S., as well as from several overseas suppliers. A preferred anion exchange membrane A for the purpose of this invention is Ionics AR108, a base resistant membrane.

The feed water solution 2 is flowed through base producing compartments 9 (optionally filled with anion exchange resin as described above) and collected as at least a partially desilicized water product 3. The bipolar membrane BP is positioned in the stack with the cation resin side facing the cathode and the anion resin side facing the anode. Hydroxide ($OH^-$) formed at the interface of the anion and cation resin laminate in the bipolar membrane BP moves in the general direction of the anode 6, under the electrical potential driving force induced by the cathode 5 and the anode 6, which are connected to a suitable DC external power supply (not shown). The hydroxide flux increases the pH of the solution in compartments 9, and in the case where anion resin is present, maintains at least a fraction of the ion exchange capacity of the resin in the hydroxide form. These effects serve to ionize silica and other weakly ionized acidic substances present in the water into negatively charged ions which move across the anion membrane A and into the adjacent acid producing compartments or chambers 8 where they are collected and removed in solution 4. Solution 4 may originate from feed water from the same source as 2, or from a separate source 1 and solution 4 optionally may be partially recirculated to feed solution 1 to save water.

At both ends of the multi-membrane stack it is necessary to use electrodes to bring in the electric current from the DC power supply. The electrodes serve no other function and in this respect their presence is only incidental for the purpose of the invention. The anode may consist of platinized titanium or niobium, while the cathode may consist of Hastelloy C ™ or stainless steel, for example.

The incidental cathode solution in cathode compartment 7 may optionally be combined with solution 3, removed separately, or partially recirculated. The incidental anode solution in anode compartment 10 may optionally be combined with solution 4, removed separately, or partially recirculated. However, it is generally not wise to recycle anode solutions to the feed or to other compartments of the membrane stack because of the long term degradation of components which may result from the presence of anodic oxidation products in the anode solution. Other arrangements of the incidental electrode cells besides the configuration described should be obvious to those versed in the art.

Figure 2:
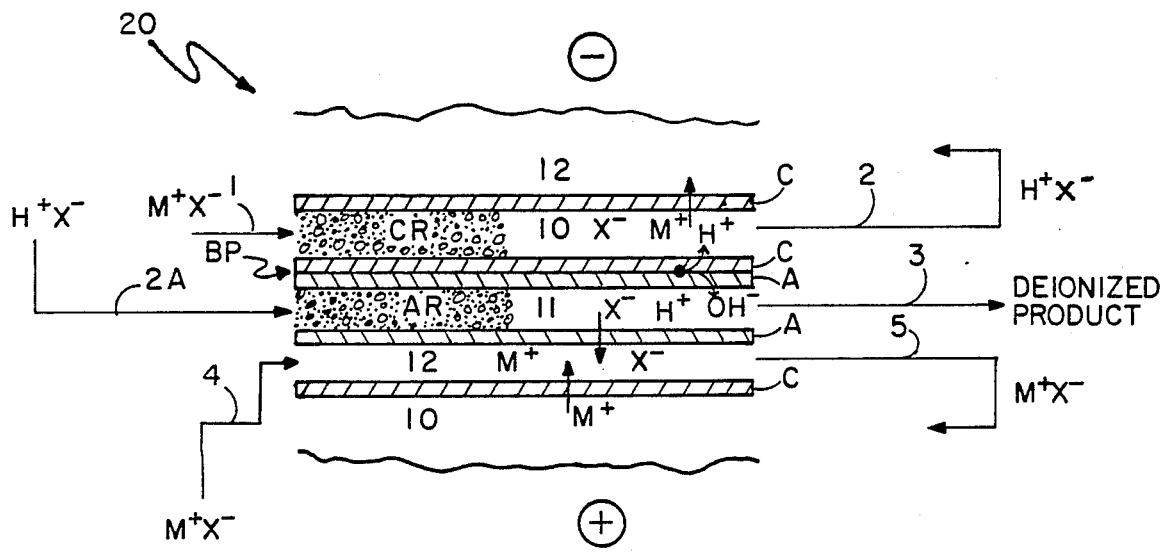
FIG. 2 is a schematic of a second embodiment of the invention using a two-bed exchange apparatus.

FIG. 2 is a schematic of a second embodiment of this invention showing only one repeating section. It is to be understood however that located between the cathode ⊖ and anode ⊕ would be many repeating units or sections to form a multiple unit or section stack 20. The apparatus depicted may be used in the continuous (or intermittent) flow, electrically regenerated, two-bed ion exchange deionization of water. Alternately, the apparatus may be used to electrically remove silica, carbon dioxide, and other normally weakly ionized, acidic substances present in the water, which substances become more strongly ionized in a basic environment, and thus are susceptible to removal from water by anion resin in the hydroxide form, while simultaneously acidifying the feed water to a desalting or electrodeionization stack, to avoid formation of basic precipitates, without need for a water softening step.

In the two-bed deionization process, the feed solution 1 containing dissolved salt, $M^+X^-$ ($M^+$ represents cations and $X^-$ anions) is flowed through acid producing (acidification) compartments or chambers 10, which are filled with cation exchange resin CR of the strong acid type and collected as an acidic effluent solution 2, in which the major portion of the salts have been converted to their corresponding acids $H^+X^-$. Solution 2 may then be flowed in turn through base producing compartments 11, which are filled with anion exchange resin AR of the strong base type, wherein the acids are removed, resulting in a deionized product solution 3. It is recognized that the sequence of flow could be from compartments 11 to compartments 10 to first form base, followed by removal of the base in the acid compartments. This process may result in the formation of basic precipitates, therefore the formation of acid in compartment 10 followed by removal of the acid in compartment 11 is the preferred process.

As in the first embodiment (FIG. 1) the resins may be in the form of beads, fibers, porous solid, or extensions of the ion-exchange membranes into the liquid flow path, such as by embossing.

A special case of this second embodiment would be to deionize water for boiler feed, for preparation of ultrapure water, or any applications which require substantially complete deionization of water.

The two-bed apparatus described would perform the bulk of the deionization with little or no additional base or acid requirement. It is recognized that in some cases further treatment, such as by conventional mixed bed deionization, or electrodeionization may be necessary to completely deionize the water to the desired level.

The salts and other electolytes removed from the feed solution 1 are collected in more concentrated form in concentrating compartments 12 and removed as a concentrated salt ($M^+X^-$) solution 5. The make-up or feed to compartments 12 is a salt solution 4, which may originate from the same source as feed solution 1 or some other more convenient source, and may include a portion of the concentrated effluent salt solution 5 recirculated to obtain a higher electrolyte (salt) concentration and thus reduce the solution requirement. In the case of water deionization, this partial recirculation of the concentrated solution would increase the yield of deionized water obtained from the feed water 1.

The acid and base required to regenerate the cation and anion resins, respectively, are produced "in situ" electrically by a bipolar membrane BP interposed between a cation membrane C and an anion membrane A. Water at the interface of the anionic A and cationic C resin layers of the BP membrane is dissociated by the imposed electric field into hydrogen ions ($H^+$) and hydroxide ions ($OH^-$). The electric field is generated by an external DC power supply connected to the electrodes 5 and 6 at the two ends of an array of multiple repeating sections of the configuration indicated in FIG. 2. The hydrogen ions are driven by the electric field toward the cathode end of the array, or stack, and into compartments 10 where other cations M+ are displaced from the cation resin CR by the hydrogen ions and eventually removed across cation membrane C into salt concentrating compartments 12. Likewise, the hydroxide ions displace the anions X− into compartments 12. The net result is the deionization of the feed solution 1 and the transfer of the dissolved electrolytes to solution 5. Compartments 12 usually need not be filled with ion exchange resin, but in some cases it may be desirable to do so in order to reduce the electrical resistance of the compartment.

The apparatus may be operated in a continuous flow mode with the electric power on while the deionization is being performed. Alternatively, it may be operated in an intermittent mode, with a distinct deionization step with or without applied electric power followed by a distinct regeneration step under applied power. No flow is necessary through compartments 12 during the deionization step if the electric power is not turned on. This would be analogous to conventional ion exchange, except that when the resins are "exhausted" as indicated by the quality of the deionized product, they would be electrically regenerated. During regeneration, no flow is necessary through compartments 10 and 11, but in some cases it may be more efficient to maintain some flow. It may also be desirable to fill these compartments with a saline solution to improve the regeneration efficiency. The saline solution will be at least partially converted to base or acid, as the case may be. For instance, to regenerate silica laden anion resin, a 5 to 15% sodium chloride may be desirable. During regeneration, some flow through compartments 12 is desirable to remove the salts or electrolytes which are being removed from the resins and across the membranes during the regeneration step.

A third embodiment (FIG. 3) of the invention concerns the electrically regenerated two-bed ion exchange apparatus 20 in combination with the apparatus of EDI, EDR or ED 30. One objective of this third embodiment is to electrically pretreat the feed to the deionization or desalting step to control basic scale formation, without the need for softening the feed water. Another objective is to achieve electrical removal of weakly ionized acidic substances, such as silica and carbon dioxide. These objectives are achieved in the electrically regenerated two-bed, ion exchange deionization apparatus 20 previously described in FIG. 2, by using the proper arrangement of the flow streams between the different apparatuses. In summary, the salts in the water 1 to be deionized are first at least partially converted electrically to acid and secondly the resulting acidified water is then deionized. In the last step, silica and other similar substances are also removed from the deionized water.

Figure 3:
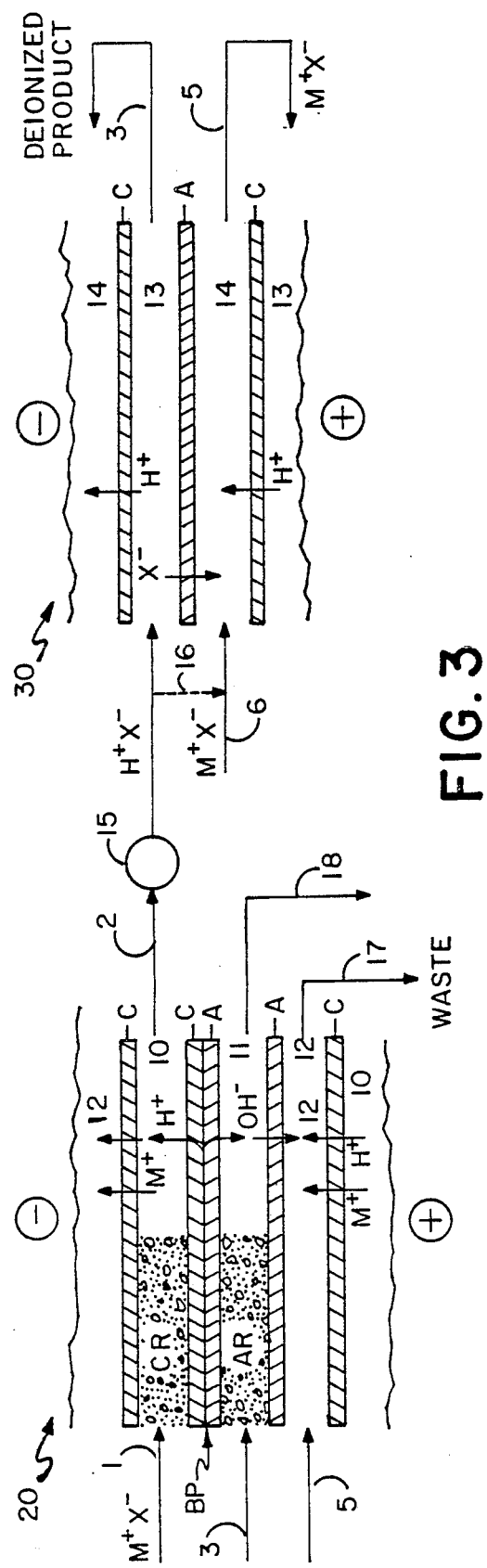
FIG. 3 is a schematic of a third embodiment of the invention using the apparatus of FIG. 2 in combination with a deionization apparatus.

The combination flow sheet, of this third embodiment is shown schematically in FIG. 3. At least part of the water to be fed to the desalting or deionizing compartments 13 of an EDI, EDR or ED membrane stack 30, is first treated by flowing salt solution 1 through cation resin filled compartments 10 (of the FIG. 2 apparatus) where at least a fraction of the salts in the water are converted to their corresponding acids and removed as solution 2. This acid solution 2, (which can be recombined with the balance of the feed solution 1 if only a fraction of the feed salt solution had been flowed through the acidifying compartment 10), is in turn fed to either a EDI, EDR or ED membrane stack 30 for electric desalting or deionization. By virtue of the acid content of the feed solution 2 predesigned to the proper level by using well known engineering and chemical parameters, such as the pH and the Langelier Index, any possibility of basic precipitate formation, such as calcium carbonate, is minimized. The possibility of carbonate formation would be diminished further by aeration 15 of the acidified feed solution 2 to remove carbon dioxide prior to desalting or deionization in stack 30. The resulting desalted or deionized water 3 from stack 30 is then returned to the electrically regenerated two-bed stack 20 and introduced as solution 3 into base producing compartments 11, where it comes in contact with anion exchange resin AR which is at least partially in the hydroxide form, and in which any salt present will be converted at least partially into their corresponding hydroxides. Since most or all of the acid in the feed water 2 will have been removed by the desalting or deionization stack 30, the net effect of the exposure to the flux of hydroxide ions and the anion resin AR in compartments 11 is to remove a fraction of the silica and similar substances, as described earlier in this writing. The desalted product water is removed at effluent pipe 18.

The cations M+ displaced from the feed water 1 in compartments 10 are driven through the cation membrane C into concentrating compartments 12, along with some acid (in the form of H+ ions). Base (in the form of OH− ions) driven through the anion membrane A from compartments 11 into compartments 12 will exceed the amount of acid removed from solution 2 during the desalting or electrodeionization step. This will result in a basic environment in compartments 12. The base or acid content in these compartments can be controlled by adjusting the fraction of concentrated solution 5 from the desalting or deionization stack 30 which is used as feed solution 5 to the salt concentrating compartments 12 of stack 20.

Solution 6 fed to the salt concentrating compartments 14 of stack 30 could be obtained directly from solution 1 or from solution 2 via pipe 16 but generally solution 1 would be preferred because desalted water product would be saved.

Flow through salt concentrating compartments 12 of stack 20 and 14 of stack 30 may be combined in a common recirculation arrangement, with common make-up from either solutions 1 or 2, with solution 1 preferred because again water product 3 would be saved.

The preferred configuration of the electrically regenerated two-bed apparatus 20 is a multi-compartment membrane stack containing in each repeating section or unit a bipolar membrane (BP), a cation membrane (C) and an anion membrane (A) forming the three compartments 10, 11 and 12.

Operation of either the electrically regenerated two-bed apparatus 20, the desalting or electrodeionization stacks 30, and combinations thereof could be continuous, intermittent or batch, staged, or any combination thereof well known to those versed in the art.

EXAMPLE 1

Figure 4:
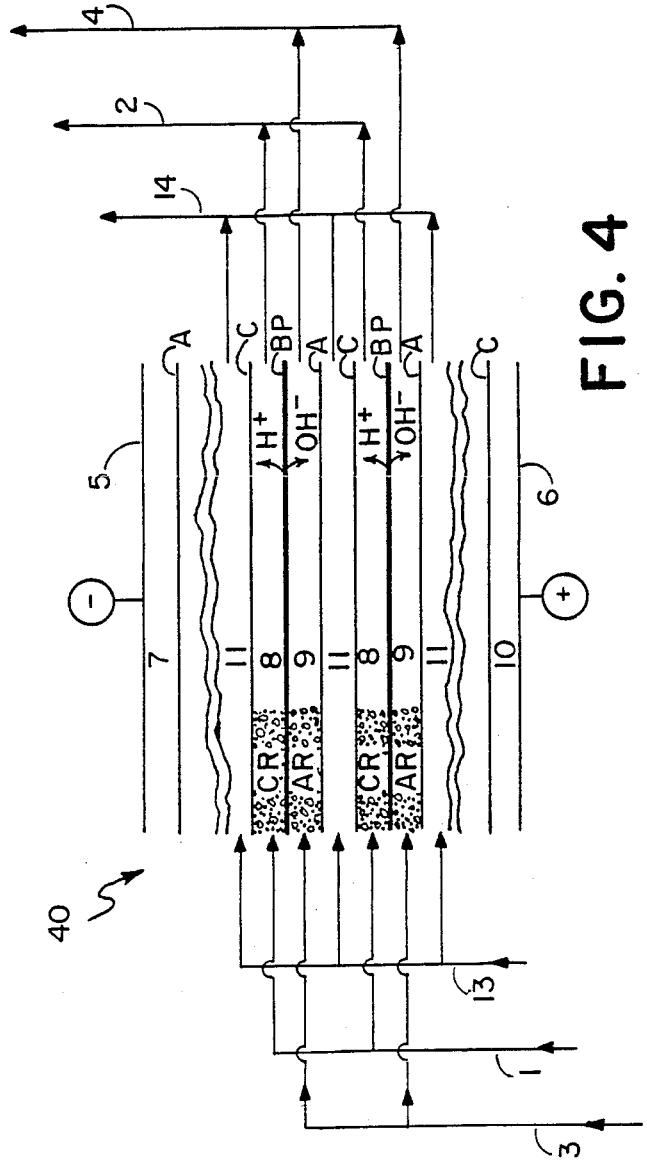
FIG. 4 is a schematic of a multi-compartment apparatus used in Examples 1, 2 and 3 as described hereinafter.

A multi-compartment test cell 40 is assembled according to the schematic in FIG. 4, in the following configuration from bottom to top: anode 6; cation membrane C; anion membrane A; bipolar membrane BP; C; A; BP (with three additional repeating units of C; A; and BP for a total of five BP's in the multi-compartment cell or stack). The sequence ends with a C adjacent to the cathode 5. The base producing compartments 9 bounded by the A's and the BP's are filled with anion resin AR (Rohm & Haas IRA 458) in the chloride form and the compartments 8 bounded by the C's and the BP's are filled with cation resin CR (Rohm & Haas IR 120) in the sodium form. The C's are CR65AZR and the A's are AR108CZR available from Ionics, Incorporated, Watertown, MA.

The effective area of each membrane is 11 sq. cm. and the spacing between membranes is 0.6 cm. Approximately 7.5 cc of resin is used to fill each resin compartment. The electrodes are platinized titanium.

The cell is operated to simultaneously acidify the feed to the deionization compartments of an EDR deionization stack 30 as shown in FIG. 3 while removing silica from the resulting deionized water product. Into the CR compartments 8 of FIG. 4 is fed ultrafiltered Watertown, Massachusetts, tap water 1 at a rate of 30 cc/min. This water has a pH 7.2, an electrical conductivity of 75.3 microSiemens/cm $\mu$S/cm), and contains 2 ppm silica. The tap water 1 is acidified continuously in the CR compartments 8 and this resulting acidified water 2 is fed to the deionization compartment of an EDR stack (not shown) where it is deionized to a water with an electrical conductivity of 12.4 S/cm and a pH of 5.4, but which still contains 2 ppm silica. This deionized product from the EDR stack is fed back to cell 40 by way of inlet 3 into the base producing compartments 9 at 15 cc/min, resulting in a desilicized product stream 4 having better than 97% removal of the silica from the deionized product water 3.

During operation of the stack 40, a tap water stream (not shown) is recirculated through the cathode compartment 7 and anode compartment 10 respectively. Also a tap water stream 13 is fed into the salt concentrating compartments 11 and removed therefrom as a salt waste stream 14.

The experiment is performed as described below:
The power to the electrodes is turned on to create a DC current of 100 milliamperes (ma) across the cell 40. For the first hour of operation there is no significant removal of silica from the deionized EDR product 3. After one and a half hours of operation the silica content of the effluent product stream 4 is 0.25 ppm. After two hours the silica content of the product stream 4 has dropped to 0.05 ppm or less. The silica removal effect continues at the same rate for 7 hours after the current is turned off, at which time the experiment is discontinued. The pH of the desilicized product water 4 ranged from 9.5 to 10. While the deionized water 3 is being desilicized, approximately 42% of the salts in the Watertown tap water feed 1 are being converted to acid in the cation resin CR compartments 8 of the cell. The pH of the resulting acidified Watertown tap water drops to 3.6, where it stabilizes until the electric power is shut off three and a half hours after it is turned on. It is calculated from the electrical conductivity and the pH that the original Watertown tap water feed has approximately 35 ppm total dissolved solids (TDS), of which 15 ppm is converted to acid in the CR compartments 8. The deionized water 3 from the EDR stack contains approximately 4 ppm TDS, in each case not including the 2 ppm silica.

The electrical conductivity of the water is measured by means of a YSI Model 32 Conductance Meter made by the Scientific Division of the Yellow Springs Instrument Co., Inc., using a conductivity cell with a cell constant of 1, and automatically referred to 25° C. The silica content of the water is measured by means of a Hach DR/3 Spectrophotometer, using the molybdate colorimetric method.

EXAMPLE 2

The same cell 40 is used as in Example 1, except that the AR and the CR are returned to their original chloride and sodium forms before the start of the run.

For this experiment, ultrafiltered Watertown tap water 1 is fed into the CR compartments 8, and the resulting acidified product 2 is in turn fed via line 3 to the AR base producing compartments 9 at a flow rate of 15 cc/min., while a DC current of 100 ma is applied. The electrical conductivity and, the silica content of the product effluent 4 from the AR compartment is checked. After one and a half hours of operation the product 4 has stabilized at a silica content of less than 0.1 ppm and a pH of 10.1. When the product 4 is adjusted with carbon dioxide to a neutral pH (6.5 to 7.0), the TDS, as measured by electrical conductivity, is 25% of the Watertown tap water TDS, indicating removal of 75% of the salts in the original tap water. Steady operation was observed under these conditions for a period of four hours, after which the experiment is terminated.

This example demonstrates the two-bed desalting mode of FIG. 2. The AR exchange apparently is more efficient than the CR exchange, resulting in a net basic product in the experimental cell. The conductivity of the final desilicized product 4 must be measured at a neutral pH, to be representative of the TDS, thus the neutralization with carbon dioxide.

EXAMPLE 3

The same cell 40 used in Example 1 is used in this example.

The feed 3 to the AR compartments 9 was made up of water containing 30 ppm silica, prepared by dissolving sodium silicate in ultrapure water, adjusting the pH to near neutral with carbon dioxide, and allowing to age for at least overnight. The water contained approximately 42 ppm TDS (expressed in terms of sodium chloride), based on its electrical conductivity of 90 S/cm at 25° C. The pH of this water is 7.2.

The feed 1 to the CR compartments 8 was made up of 440 ppm sodium chloride in ultrapure water. The electrical conductivity of this water is 953 S/cm and the pH is 5.8.

Each feed was flowed at 15 cc/min and the current was 100 ma. The experiment is run for 8 hours. After one hour the products from the compartments have stabilized. During the next 7 hours of operation the product 4 from the AR compartments is less than 0.15 ppm silica at a pH averaging 10.8. The product 2 from the CR compartments averages an electrical conductivity of 2710 $\mu$S/cm and a pH of 2.35. The percentage of the salts in the water passing through the CR compartments which is converted to acid is 78%.

About 27% of the silica removed from the feed water 1 (containing 30 ppm silica) appears in the salt receiving compartments 11 which are separated from the AR compartments by an anion membrane A; thus indicating continuous regeneration of the AR at least at the rate of (0.27) (30) or 8 ppm silica. The rest of the silica appears to remain in the AR.

After 8 hours of operation, the flow rate of the feed water 1 (containing 30 ppm silica) is increased to 70 cc/min. After three hours, practically no silica is being removed, indicating that the AR capacity for silica has been exhausted.

At this point the AR is regenerated electrically to elute absorbed silica and to return it to the chloride form using a 2N sodium chloride solution, by the following procedure:

(1) Feed the salt solution into the AR compartments at 15 cc/min for 15 minutes, with the current set at 200 ma.
(2) Stop the solution flow for one hour, while maintaining the current.
(3) Repeat (1) and (2) above.
(4) Feed salt solution again at 15 cc/min for 15 minutes.
(5) Turn the current off and flush with ultrapure water at 15 cc/min.

Each of the effluents from the regeneration steps is analyzed for silica and it is found that approximately 80% of the silica (which had not been transferred into the compartments adjacent to the AR compartments) is removed by the electrical regeneration step. The effluents are also analyzed for sodium hydroxide and it is estimated that the maximum base concentration reached inside the AR compartments was 1.4N. During the entire operation of Example 3, the 440 ppm salt solution was fed to the CR compartments.

EXAMPLE 4

The regenerated cell of Example 3 is used for this example.

The feed to the AR compartments 9 contains 8 ppm silica and the equivalent TDS of 44 ppm sodium chloride, is fed at 15 cc/min. under a current of 100 ma. The feed to the CR compartments 8 is the same as in Example 3.

The duration of the run is 7 hours. After 4 hours of operation the silica in the effluent from the desilicizing compartments 9 stabilizes at approximately 0.15 ppm or at 98% removal and the pH stabilizes at approximately 10.9. A material balance on the silica indicates that approximately half of the silica removed appears in the concentrating compartments 11 adjacent to the AR compartments 9. Approximately 90% of the salt in the water feed 1 to the AR compartments is converted to base.

EXAMPLE 5

The experiment in Example 4 is repeated, except that the anion resin AR is omitted from the base producing compartments 9.

This experiment is run for 8 hours. The effluent 4 from the base producing compartments averages pH 10.7, and the silica content 0.3 ppm after 2 hours of operation. The silica increases as the run progresses, and levels at approximately 4 ppm, (or 50% removal) near the end of the 8 hour run. A material balance on the silica indicates that essentially all the silica removed appears in the concentrating compartments 11 adjacent to the base producing compartments 9.

EXAMPLE 6

A multi-compartment cell (or stack) is assembled according to the schematic in FIG. 1, in the following configuration: anode 6, anion membrane (A); A; bipolar membrane (BP); A; BP; A (with three repeating units of BP; A for a total of five BP's in the multi-compartment cell). The sequence ends with an A next to the cathode 5. The compartments bound by the anion membrane side of the BP and the A are filled with anion resin (AR) (Rohm & Haas IRA458) in the chloride form. The anion membrane side of the BP is oriented facing the anode 6 end of the cell. The A's are Ionics, Incorporated AR108CZR.

The effective area of each membrane is 11 sq cm and the spacing of compartment 9 between the A and the BP membrane is 0.32 cm. Approximately 3 cc anion resin (AR) is used to fill each compartment 9. The electrodes are platinized titanium. The 0.32 cm. spacing between membranes in the unfilled compartments 8 is supported in the flowpath by a polypropylene screen (not shown).

The cell is operated as follows to remove silica from Watertown tap water 2 which had been previously deionized by electrodialysis reversal (EDR):

Water 2 deionized by EDR having an electrical conductivity of 12.4 S/cm, pH 5.4, and containing 2 ppm silica is fed to the AR compartments 9 at 15 cc/min., resulting in a water product 3 having better than 97% removal of the silica from the deionized water feed 2. Watertown tap water 1 is fed to the unfilled compartments 8 at a rate of 15 cc/min. This water has an electrical conductivity of 75.3 $\mu$S/cm, and a pH of 7.2, and contains 2 ppm silica. The resulting water effluent 4 is lightly acidified by its passage through the cell, when operating at a steady state.

The experiment is performed as described below:

The power to the electrodes is turned on to create a DC current of 100 milliamperes (ma) across the cell. For the first half hour of operation there is no significant removal of silica from the deionized EDR product water feed 2. After 45 minutes of operation, the silica content of the effluent water 3 is 0.25 ppm. After one hour the silica content has dropped to 0.05 ppm or less. The removal of silica continues at this rate for several hours, until the experiment is discontinued. The pH of the resulting desilicized water product 3 ranges from 9.5 to 10. While the deionized feed water 2 was being desilicized, approximately 10% of the salts in the Watertown tap water feed 1 are being converted to acid in the unfilled compartments 8 of the cell.

It will be understood that the embodiments described herein are variations and modifications without departing from the spirit and scope of the invention. All such modifications and variations are intended to be included within the scope of the invention as defined in the appended claim.

I claim:

1. A multi-compartment or chamber electrodeionization apparatus comprising in combination a plurality of chambers, the two end chambers comprising the electrode chambers, one chamber having disposed therein a negative electrode, the other a positive electrode, said apparatus comprising a plurality of alternating base producing and acid producing chambers defined by alternatingly arranged anion exchange membranes and bipolar membranes, said bipolar membranes positioned in the apparatus with the cation exchange resin side facing the cathode and the anion exchange resin side facing the anode, said base producing chambers containing a fluid permeable filler of anion exchange material; inlet means for introducing liquid to be treated into the filled base producing chambers and outlet means for a withdrawal of the liquid from said chambers with further means for recirculating at least a portion of said withdrawn liquid back as a feed stream to said acid producing or electrode chambers, inlet means for passing liquid into the acid producing and electrode chambers, and outlet means for withdrawal of liquid from said chambers, and means for passing a direct current transversely across the membranes and chambers.

2. A multi-compartment or chamber electrodeionization apparatus comprising in combination a plurality of chambers, the two end chambers comprising the electrode chambers, one chamber having disposed therein a negative electrode, the other a positive electrode, said apparatus containing between said electrode chambers at least one three chamber unit, each unit comprising an acid producing, a base producing and a salt concentrating chamber in juxtaposition and separated from each other by ion-exchange membranes, said acid producing chamber defined on the side facing the cathode by a cation exchange membrane and on its other side being separated from the adjacent base producing chamber by a bipolar membrane, said bipolar membrane positioned in the apparatus with the cation exchange resin side facing the cathode and the anion exchange resin side facing the anode, said base producing chamber being further defined from the next adjacent salt concentrating chamber by an anion exchange membrane, the said salt concentrating chamber being further defined on its side facing the anode by a cation exchange membrane, means for introducing liquids into said electrode chambers and into each of said three chambers of said unit, means for withdrawal of liquids from said electrode chambers and from each of said three chambers, and means for passing a direct electric current transversely across said membranes and chambers.

3. The apparatus of claim 2 wherein the base producing chamber contains a fluid permeable filler of anion exchange material.

4. The apparatus of claim 2 wherein the acid producing chamber contains a fluid permeable filler of cation exchange material.

5. The apparatus of claim 2 wherein means are provided for introducing at least a part of the liquid withdrawn from said acid producing chamber into said base producing chamber.

6. The apparatus of the three chamber unit of claim 2 wherein means are provided for introducing at least a part of the liquid from said acid producing chamber into the desalting or deionizing chamber of an electrodialysis, electrodeionization or electrodialysis reversal membrane stack.

7. The apparatus of the three chamber unit of claim 2 wherein means are provided for introducing at least a part of the liquid from said acid producing chamber into the salt concentrating chambers of an electrodialysis, electrodeionization or electrodialysis reversal membrane stack.

8. The apparatus of claim 6 or 7 wherein means are provided for introducing at least part of the liquid effluent from said desalting or deionizing chamber or from said salt concentrating chamber into the base producing chamber of each of said three camber unit.

9. The apparatus of claim 2 wherein said base producing chamber contains a strongly basic anion exchange filler material and said acid producing chamber contains a strongly acidic cation exchange filler material and whereas means are provided for deionizing said liquid by passage of said liquids through said resin filled chambers without use of said direct current means, with further means for introducing a saline solution into said filled chambers along with means for reapplying said direct current for electrically regenerating said anion and cation exchange material therein when the said exchange material becomes exhausted.

10. The apparatus of claim 9 wherein said means for deionizing said liquid by passage of said liquid through said resin filled chambers is with use of direct current means.

11. A process for the removal of weakly ionized acidic substances such as silica from an aqueous solution using a multi-compartment electrodeionization apparatus having two end electrode compartments containing an anode and cathode respectively and located between said electrodes a plurality of alternating base producing and acid producing compartments defined by alternatingly arranged anion exchange membranes and bipolar membranes, said bipolar membranes positioned in the apparatus with the cation exchange resin side facing the cathode and the anion exchange resin side facing the anode, at least said base producing compartments containing a fluid permeable filler of anion exchange material; said process comprising passing said aqueous solution to be treated as a feed stream through said base producing compartments, passing an aqueous solution through said acid producing and electrode compartments, passing a direct electric current transversely through said compartments and membranes to cause the generation of base from the interface between the cation and anion resin laminate of the said bipolar membrane into said anion resin filled compartments and removing the effluent from said base producing compartment as a product containing a lesser amount of weakly ionized acids than was originally present in said feed solution and recirculating at least a portion of the effluent product from the base producing compartment back as an aqueous feed stream to said acid producing or electrode compartments.

12. A process for the removal of dissolved salts from an aqueous solution using a multi-compartment electrodeionization apparatus having two end electrode compartments containing an anode and a cathode respectively and located between said electrodes at least one three compartment unit, each unit comprising an acid producing, a base producing and a salt concentrating compartment in juxtaposition and separated from each other by ion-exchange membranes, said acid producing compartment defined on the side facing the cathode by a cation exchange membrane and on its other side being separated from the adjacent base producing compartment by a bipolar membrane, said bipolar membrane positioned in the apparatus with the cation exchange resin side facing the cathode and the anion exchange resin side facing the anode, said base producing compartment being further defined from the next adjacent salt concentrating compartment by an anion exchange membrane, the said salt concentrating compartment being further defined on its side facing the anode by a cation exchange membrane, said process comprising passing an aqueous feed solution into and through at least said acid producing and base producing compartments, passing a direct electric current transversely through all of said compartments and membranes to cause the generation of base and acid respectively from the interface between the cation and anion resin laminate of said bipolar membrane, said generated base passing into said base producing compartment located adjacent to one side of said bipolar membrane and said generated acid passing into said acid producing compartment located adjacent to the other side of said bipolar membrane, and removing the effluent from said base producing compartment as a product containing a lesser amount of dissolved salts than was originally present in the feed solution, and removing the effluent from said acid producing compartment as a product containing a greater amount of acid than was originally present in the said feed solution.

13. The process of claim 12 wherein at least a part of the acidified effluent from the said acid producing compartment is passed as a feed influent solution to the said base producing compartments.

14. The process of claim 12 wherein at least a portion of the acidified effluent from the said acid producing compartments is partially desalted or deionized by passage to the salt removal compartments of an electrodialysis, electrodeionization or electrodialysis reversal stack.

15. The process of claim 12 wherein at least a portion of the acidified effluent from the said acid producing compartments is passed to the salt concentrating compartments of an electrodialysis, electrodeionization or electrodialysis reversal stack.

16. The process of claim 14 or 15 wherein at least a portion of the partially desalted or deionized effluent from said electrodialysis, electrodeionization or electrodialysis reversal stack is passed as an influent to the base producing compartments of the said three compartment unit and removing from said base producing compartment a product effluent which is substantially free of dissolved salts including weakly ionized acidic components such as silicic acid.

17. The apparatus of claim 7 wherein means are provided for the aeration of the liquid from said acid producing chamber to remove carbon dioxide prior to passage of said liquid into the electrodialysis, electrodeionization or electrodialysis reversal membrane stack.

* * * * *